United States Patent
Shamir et al.

(10) Patent No.: US 9,021,107 B2
(45) Date of Patent: Apr. 28, 2015

(54) EMBED CONTROL COMMANDS AND PRODUCT EXTENSIONS WITHIN RFB SESSION

(75) Inventors: Oren Shamir, Jerusalem (IL); Moshe Valenci, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 12/643,794

(22) Filed: Dec. 21, 2009

(65) Prior Publication Data

US 2011/0153846 A1    Jun. 23, 2011

(51) Int. Cl.
*G06F 15/16*  (2006.01)
*H04L 29/08*  (2006.01)

(52) U.S. Cl.
CPC ..................... *H04L 67/14* (2013.01)

(58) Field of Classification Search
CPC . H04L 41/22; H04L 41/0213; H04L 41/0893; H04N 21/4143; H04N 5/44543; G06F 8/60
USPC ........................................................ 709/228
See application file for complete search history.

(56) References Cited

U.S. PATENT DOCUMENTS

| | | | |
|---|---|---|---|
| 6,308,205 B1 * | 10/2001 | Carcerano et al. ............ | 709/221 |
| 6,505,238 B1 * | 1/2003 | Tran ............................. | 709/208 |
| 2002/0133580 A1 * | 9/2002 | Dake et al. ................... | 709/223 |

FOREIGN PATENT DOCUMENTS

EP    1215570 A1 *  6/2002  ................ G06F 9/44

OTHER PUBLICATIONS

Won, Brian. "A new dawn for remote management? A first glimpse at Intel's vPro platform". http://arstechnica.com/hardware/news/2007/02/vpro.ars. Feb. 2007. pp. 1-7.*
Intel Active Management Technology Overview, access date Dec. 18, 2009, pp. 1-2.
Understanding the Remote Desktop Protocol (RDP), Article ID: 186607, Microsoft—Mar. 27, 2007, pp. 1-2.
Applications of VNC, RealVNC Limited, http://www.realvnc.com/vnc/how.html, access date Dec. 17, 2009, 1 page.
Richardson, Tristan, The RFB Protocol, Real VNC Ltd., Version 3.8, Nov. 24, 2009, pp. 1-43.

* cited by examiner

*Primary Examiner* — John MacIlwinen
(74) *Attorney, Agent, or Firm* — Schwabe, Williamson & Wyatt, P.C.

(57) ABSTRACT

According to various embodiments, methods, apparatuses and systems are provided that allow a management server coupled to a managed device to establish a management session with a management station in accordance with a management protocol. A management server may forward to the management station modified user interface display that provides additional functions to the management station. The management station may interact with the modified user interface display and evoke the additional functions through the use of keyboard, mouse or any suitable user interface input means. Other embodiments may be described and claimed.

20 Claims, 5 Drawing Sheets

EMBED CONTROL COMMANDS AND PRODUCT EXTENSIONS WITHIN RFB SESSION

TECHNICAL FIELD

Embodiments of the present invention relate to the field of device management, in particular, to provide additional management functions to various management stations without modifications to the management stations, thereby maintaining the compatibility with the management stations.

BACKGROUND

Advances in microprocessor and related technologies have led to wide spread deployment and adoption of general purpose as well as special purpose computing devices. Special purpose computing devices include but are not limited to digital cameras, camcorders, portable media players, mobile phones, mobile internet devices, set-top boxes, and digital video recorders (DVRs).

Advances in networking, telecommunication, satellite, cellular and other related technologies, either wired or wireless, along with the proliferation of broadband Internet services have also led to increased connectivity of general or special purpose computing devices over private and/or public networks, such as the Internet. Today, many computing devices are either connected to a private/public network all the time or capable of connecting to such networks on demand. As such, it is feasible, and is often more desirable, to manage these computing devices over the network in order to lower the cost of the administration.

Various management tools have been developed and deployed over the years. These management tools allow a management station to monitor and control a computing device over a network, thereby substantially reducing the need for an administrator to have actual physical access to the device. Examples of such tools include the Remote Desktop Service from Microsoft of Redmond, Wash. and Apple Remote Desktop from Apple of Cupertino, Calif. Management tools may also perform functions such as inventory update, provision, diagnostic service and error recovery, etc.

Many management tools have a client-server based architecture, which may include a management server, in forms of software or hardware, coupled to the computing device to be managed, and a management station, which may act as a client to the management server, in forms of software or hardware, connected to the management server via a network to perform management activities. Management servers may also forward the user interface display of a managed computing device to a management station, thereby allowing the management station to interact with the managed computing device through the forwarded user interface display of the managed device as if the management station is having physical access to the managed device.

Recently, the convergence towards cross-platform management protocols have made it possible for a management server that supports a cross-platform management protocol to be compatible, or interoperable, with different management stations running on various platforms. Various management stations, regardless of the platforms they are running on, may connect to the management server and perform management activities on the managed computing device, so long as the management station is compatible with the management protocol. Examples of such cross-platform management protocols include but are not limited to Virtual Network Computing (VNC), Remote Framebuffer (RFB), Remote Desktop Protocol (RDP), and X11.

One drawback of the current management tools may be that it is difficult to maintain cross-platform compatibility and at the same time expand the functionalities of the management tools. The typical approach to add additional functions to the management tool may require changes to both the management server and the management station. This is potentially less than ideal because the management server may lose compatibility, or interoperability, with management stations that are unmodified.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

According to various embodiments, methods, apparatuses and systems are provided that allow a management server coupled to a managed device to establish a management session with a management station in accordance with a management protocol. A management server may forward to the management station a modified user interface display that provides additional functions to the management station. The management station may interact with the modified user interface display and evoke the additional functions through the use of keyboard, mouse or any suitable user interface input means. These and other aspects of various embodiments will be described in greater details below.

Figure 1:
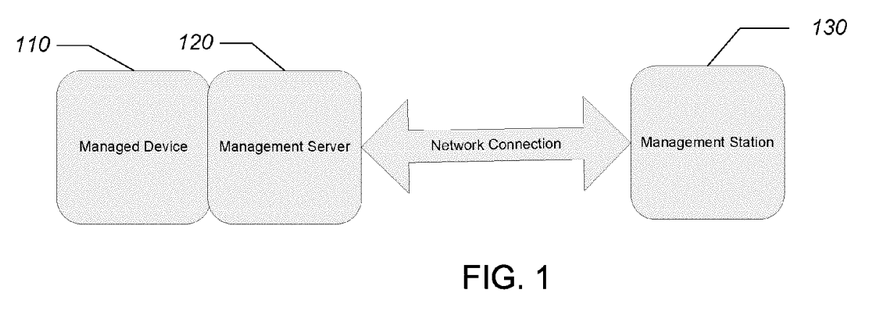
FIG. 1 illustrates a block diagram of a management server coupled with a managed device establishing a management session with a management station, in accordance with various embodiments.

FIG. 1 illustrates a block diagram of a management server coupled with a managed device establishing a management session with a management station, in accordance with various embodiments. As illustrated, for the embodiments, a managed device 110 may be coupled to a management server 120. A management station 130 may establish a management session with the managed device 110 through the management server 120. The management session may be based on one or more management protocols. In certain embodiments, the management protocol may be Remote Framebuffer (RFB).

In various embodiments, upon the establishment of a management session, the management server 120 may start one or more sessions and/or applications on the managed device 110, capture the user interface display of the newly created sessions or applications, and forward the captured user interface display to the management station 130. The management station 130 may interact with the managed device 110 through the forwarded user interface display via keyboard, mouse and/or any other suitable user interface input means as if the management station 130 is physically interacting with the managed device 110.

Alternatively, the management server 120 may also "attach" to one or more existing sessions and/or applications that are currently running on the managed device 110 by capturing the user interface display of the existing sessions and/or applications, and forward the captured user interface display to the management station 130. This may create the appearance to the user who created the sessions and/or applications on the managed device 110 that the management station 130 is "remotely controlling" the managed device 110.

In various embodiments, before the user interface display is forwarded, the management server 120 may add additional user interface elements to the captured user interface display. The additional user interface elements may be linked to additional functions. For example, the additional functions may allow management station 130 to shutdown and/or power cycle the managed device 110 even when the managed device 110 may be unresponsive due to conditions such as processor throttling under heavy load, kernel deadlock or kernel panic, denial of service attacks, etc. Other examples of the additional functions may include allowing the management station 130 to power on the managed device 110 if it is not currently powered on; to retrieve an event log from the managed device 110 even if the device is unresponsive or not powered on; and/or to block a management station 130 from accessing the managed device absent a consent from a user on the managed device, etc. These and other aspects of various embodiments will be described in greater detail below.

Even though the terms "management station", "management protocol", "management server" and "managed device" are used to refer to various components in various embodiments, it is understood that once a session is established between a managed device and a management station, the management station may interact with the managed device in any fashion through the user interface display and perform any function made available to the management station through the user interface display, including management related and/or non-management related functions, functions present in the original user interface display and/or later added by the management server, and functions that may or may not be related to the managed device. In various embodiments, some of these components, functions and/or protocols may be further subdivided or combined.

The term "user interface display" as used herein refers to the interface display through which a user of the managed device may interact with the managed device. The user interface display may be displayed locally on a console or a monitor connected directly to the managed device, or on a remotely located terminal, or simultaneously at all these places. User interface display may be non-graphical, such as a terminal display used in MS-DOS, or graphical, such as the Graphical User Interface (GUI) used in Microsoft Windows, or may be brail for visually impaired users. The term "user" may refer to an entity that interacts with the managed device, which includes, but is not limited to, a real person or a computer program.

A user may interact with the user interface display via any suitable user interface input means such as keyboard, mouse, joystick, trackpad, trackball, touch sensitive surface, movement/gesture tracking system, voice recognition system, etc. User interface input means include but are not limited to devices that are compatible with Universal Serial Bus (USB) Human Interface Device (HID) specification defined by USB Implementers Forum, Inc.

Management station 130 may be connected to the managed device 110 via a wide area network (WAN) connection spanning one or more public and/or private networks, e.g. the Internet, or may be directly connected to the managed device 110 via a wired or wireless connection in a local area network (LAN). Although FIG. 1 shows management station 130 and managed device 110 as separate blocks for clarity of illustration, it is understood that management station 130 may also be the same device as the managed device 110.

In various embodiments, the management server 120 may be a stand alone unit or integrated into the managed device 110. The management server 120 may be implemented in software or in hardware. One of the advantages of implementing the management server 120 in hardware is that the management station 130 may be able to interact with the managed device 110 and/or the management server 120 even if the managed device 110 is unresponsive due to performance degradation and failure conditions.

Figure 2:
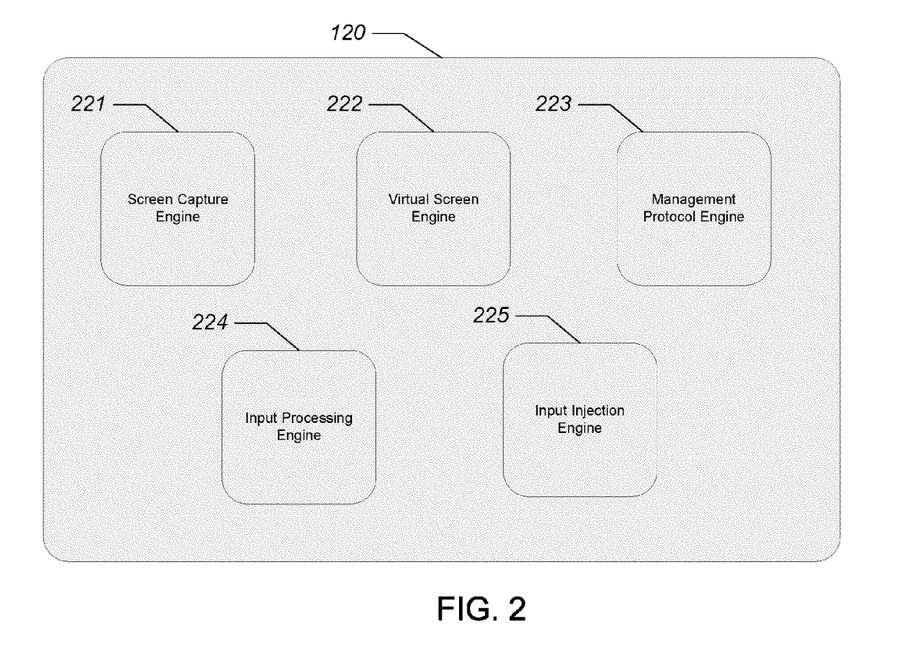
FIG. 2 illustrates in more detailed fashion the management server 120 as shown in FIG. 1 in accordance with various embodiments.

Moving on to FIG. 2, which illustrates in a more detailed fashion the management server 120 as shown in FIG. 1, in accordance with various embodiments. In various embodiments, the management server 120 may comprise a screen capture engine 221, a virtual screen engine 222, a management protocol engine 223, an input processing engine 224 and an input injection engine 225. Even though FIG. 2 shows five individual components for purpose of clarity of illustration, it is understood that any one of these components may be combined with the one or more other components and/or be integrated into a single unit, or in other embodiments, further subdivided. For example, the virtual screen engine 222 and the input processing engine 224 may be integrated into a single component, and the screen capture engine 221 and the input injection engine 225 may be integrated into a single component. FIG. 2 is not to be interpreted as a limitation to the design of the management server 120.

In various embodiments, screen capture engine 221 may capture the user interface display from the managed device 110 and forward the captured user interface display to virtual screen engine 222. Screen capture engine 221 may capture the user interface display of one or more sessions and/or applications that are currently running on the managed device 110. Alternatively, screen capture engine 221 may start one or more new sessions and/or applications on the managed device, capture the user interface display of these newly created sessions and/or applications, and forward the captured user interface display to virtual screen engine 222.

In various embodiments, management station 130 may specify which user interface display to be captured by the screen capture engine 221 when a management session is established between the management protocol engine 223 and the management station 130. If no specific user interface display is provided, the screen capture engine 221 may capture the user interface display of one or more default sessions and/or applications. The default sessions and/or applications may be agreed upon between the management station 130 and management server 120 in advance and kept in a configuration file accessible by the screen capture engine 221.

In various embodiments, screen capture engine 221 may capture the user interface display by scanning the portion of the video framebuffer to be captured. This may be achieved either by software or by hardware. One of the advantages of implementing screen capture engine 221 in hardware may be that the screen capture engine 221 may operate independently from the managed device 110. If the managed device 110 is unresponsive due to performance degradation or failure conditions, the screen capture engine 221 may still be able to capture the user interface display and forward the captured user interface display to the management station 130. The user interface display of a managed device 110 while it is in an unresponsive state may assist the management station 130 in performing post failure diagnosis and/or error recovery. In various embodiments, if the managed device is not powered on, screen capture engine 221 may forward to virtual screen engine 222 a blank screen, or notify the virtual screen engine 222 by a status message indicating such.

In various embodiments, virtual screen engine 222 may add to the original user interface display captured by screen capture engine 221 additional user interface elements that correspond to additional functions. For example, the additional functions may allow a management station 130 to shutdown and/or to restart the managed device 110; to power on the managed device 110 if it is not currently powered on; to retrieve an event log from the managed device 110; and to provide enhanced authentication mechanism to the management station 130, etc. By providing these additional functions to the management station 130 through the modified user interface display, a management station 130 may evoke these functions regardless of the operating conditions of the managed device 110. The additional functions that correspond to additional user interface elements may or may not be for the purpose of management, and may or may not be related to the managed device 110. The additional functions listed above are for exemplary purpose only and not to be interpreted as limitations to the types of functions that can be provided to the management station 130 by the management server 120.

In various embodiments, virtual screen engine 222 may present additional user interface elements corresponding to additional functions as graphical and/or non-graphical user interface elements. For example, the additional user interface elements may be presented as windows, menus, icons, buttons, tabs, etc. Alternatively, the additional user interface elements may be presented as non-graphical user interface elements, such as text terminals with or without command prompts, etc.

In various embodiments, the additional user interface elements may be arranged as an auxiliary user interface display to the original user interface display. The management station 130 may choose to view only the original user interface display, only the auxiliary user interface display, or both displays in various layouts, such as side by side.

Figure 3:
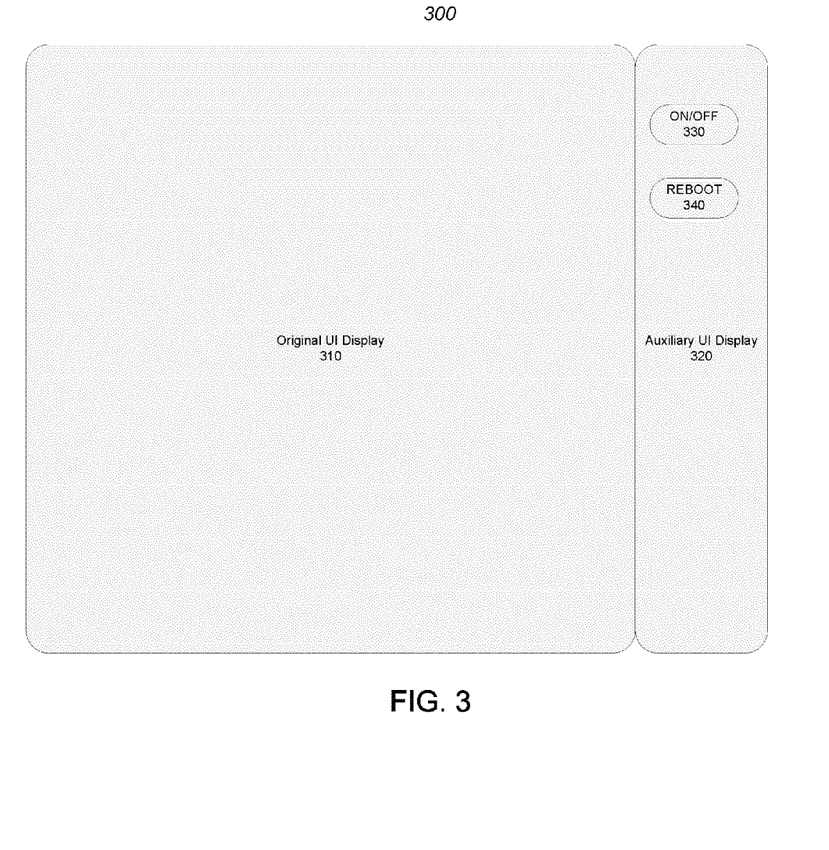
FIG. 3 is an exemplary illustration of a modified user interface display wherein the original user interface display and the auxiliary user interface display are displayed side by side, in accordance with various embodiments.

FIG. 3 is an exemplary illustration of a modified user interface display wherein the original user interface display and the auxiliary user interface display are displayed side by side, in accordance with various embodiments. The modified user interface display 300 may comprise the original user interface display 310 and the auxiliary user interface display 320. In various embodiments, the original user interface display 310 may correspond to the user interface display captured by the screen capture engine 221. If the managed device is not powered on, the original user interface display 310 may display a blank screen or merely a message to indicate to the management station 130 as such.

Auxiliary user interface display 320 may comprise additional user interface elements that are linked to additional functions, such as the ON/OFF button 330 and the REBOOT button 340 illustrated in FIG. 3. The ON/OFF button 330 may allow the management station 130 to turn the managed device 110 on or off. The REBOOT button 340 may allow the management station 130 to reboot the managed device 110. The management station 130 may evoke these functions by interacting with the auxiliary user interface display 320 portion of the modified user interface display 300, by using a keyboard, a mouse, or any suitable user interface input means. Although only two additional user interface elements are illustrated in FIG. 3, it is understood that any number of user interface elements may be included in the auxiliary user interface display 320.

Alternatively, virtual screen engine 222 may modify the original user interface display 310 by directly adding additional user interface elements to the user interface display, by replacing the user interface display with a display containing additional user interface elements, or by adding a layer of semi-transparent user interface elements on top of the original user interface display 310. Yet another alternative may include sending the additional user interface elements to the management station 130 via a separate communication channel.

In various embodiments, after the additional user interface elements are added to the original user interface display 310, the virtual screen engine 222 may forward the modified user interface display to the management protocol engine 223, which may then transmit the modified user interface display to the management station 130. Management protocol engine 223 may handle all the direct communications between the management server 120 and the management station 130. Communications between the management server 120 and the management station 130 may be made in conformance with a management protocol, such as RFB. The management protocol engine 223 may transmit the modified user interface display to the management station 130 in the exact same fashion as the original user interface display 310 would be transmitted to the management station 130, in accordance with the management protocol. The management station 130 therefore may receive the modified user interface display unaware of the modifications introduced by virtual screen engine 222. By transmitting the user interface display to a management station without making changes to the management protocol, the additional functions may be made available to any management station that is compatible with an existing management protocol, such as RFB. Accordingly, the functions provided to the management stations may be extended while the compatibilities between the management server and the management stations are maintained.

Figure 4:
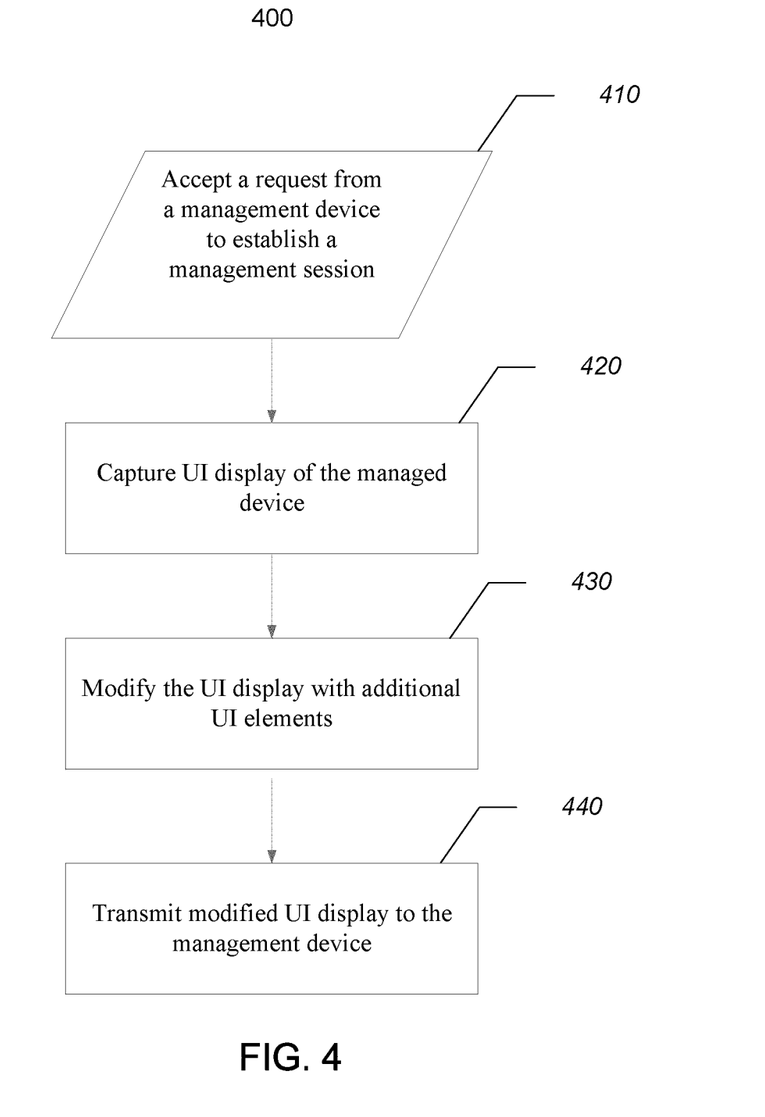
FIG. 4 illustrates a flow diagram of a portion of the operation of the management server transmitting the user interface display to a management station, in accordance with various embodiments.

Moving on to FIG. 4, which illustrates a flow diagram of a portion of the operation of the management server 120 transmitting user interface display to a management station 130, in accordance with various embodiments. In various embodiments, management protocol engine 223 may accept a request to establish a new management session from a management station 130 in box 410. Management protocol engine 223 may establish the management session with the management station 130 by exchanging handshake messages and initialization messages with the management station 130.

In various embodiments, during the initialization phase of the management session, the management station 130 may send to the management protocol engine 223 a message requesting the resolution value of the user interface display of the managed device 110. Upon receiving this request, management protocol engine 223 may send a request to virtual screen engine 222 to ascertain the resolution value. Virtual screen engine 222 may reply to management protocol engine 223 with the resolution value of the modified user interface display. Management protocol engine 223 may in turn transmit the resolution value of the modified user interface display back to the management station 130.

Once the management session is established, screen capture engine 221 may start capturing the user interface display of a specific sessions and/or applications requested by the management station 130, or the user interface display of the default sessions and/or applications agreed upon prior to the establishment of the management session in box 420. Screen capture engine 221 may forward the user interface display to the virtual screen engine 222. Virtual screen engine 222 may modify the user interface display by adding additional user interface elements that correspond to additional functions in box 430. The modified user interface display may then be transmitted to the management station 130 by management protocol engine 223 in box 440.

In various embodiments, the management station 130 may, in accordance with the management protocol, either periodically or upon certain event, i.e. user input, etc., send a message to the management protocol engine 223 to request for update information related to the user interface display. Management protocol engine 223 may relay this request to the virtual screen engine 222. Virtual screen engine 222 may reply to management protocol engine 223 with the update information of the modified user interface display. Management protocol engine 223 may then transmit the update information of the modified user interface display back to the management station 130.

Figure 5:
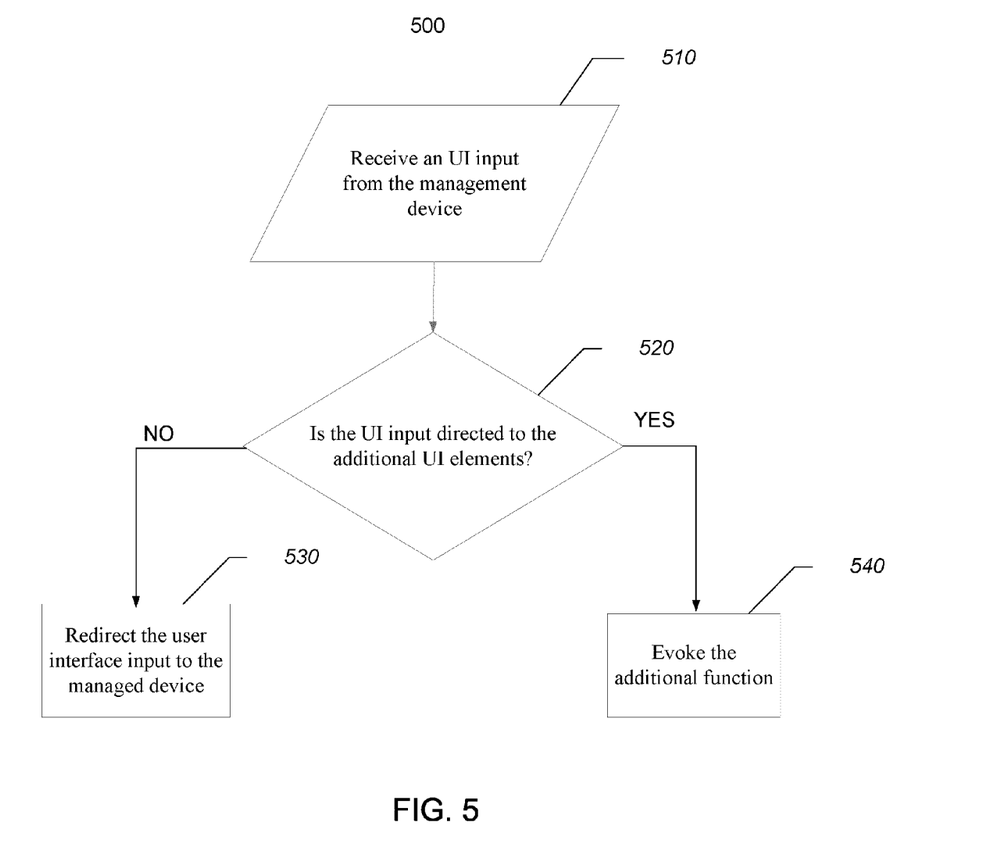
FIG. 5 illustrates a flow diagram of a portion of the operation of the management server processing user interface inputs received from a management station, in accordance with various embodiments.

Moving on to FIG. 5, which illustrates a flow diagram of a portion of the operation of the management server 120 processing user interface inputs received from a management station, in accordance with various embodiments. In various embodiments, once the modified user interface display is transmitted back to the management station 130, the management station 130 may interact with the modified user interface display through keyboard, mouse, touchpad, trackball, touch screen, or any suitable user interface input means. These interactions may be translated into user interface inputs and transmitted to the management protocol engine 223 in box 510, which then forwards the user interface inputs to the input processing engine 224.

In various embodiments, once a user interface input is received, input processing engine 224 may make a determination on whether the user interface input is directed towards the additional user interface elements or the original user interface display 310 in box 520. If the user interface input is determined to be directed towards the additional user interface elements, then input processing engine 224 may process this input by evoking the additional functions that correspond to the additional user interface elements in box 540. If the interaction is determined to be directed towards the original user interface display 310, then input processing engine 224 may process this input by simply forwarding the user interface input to input injection engine 225.

In various embodiments, input injection engine 225 may relay the user interface input directed to the original user interface display 310 to the managed device in box 530. The managed device 110 may then process the user interface input from the management station 130 as if it was a regular user interface input from the managed device itself.

Figure 6:
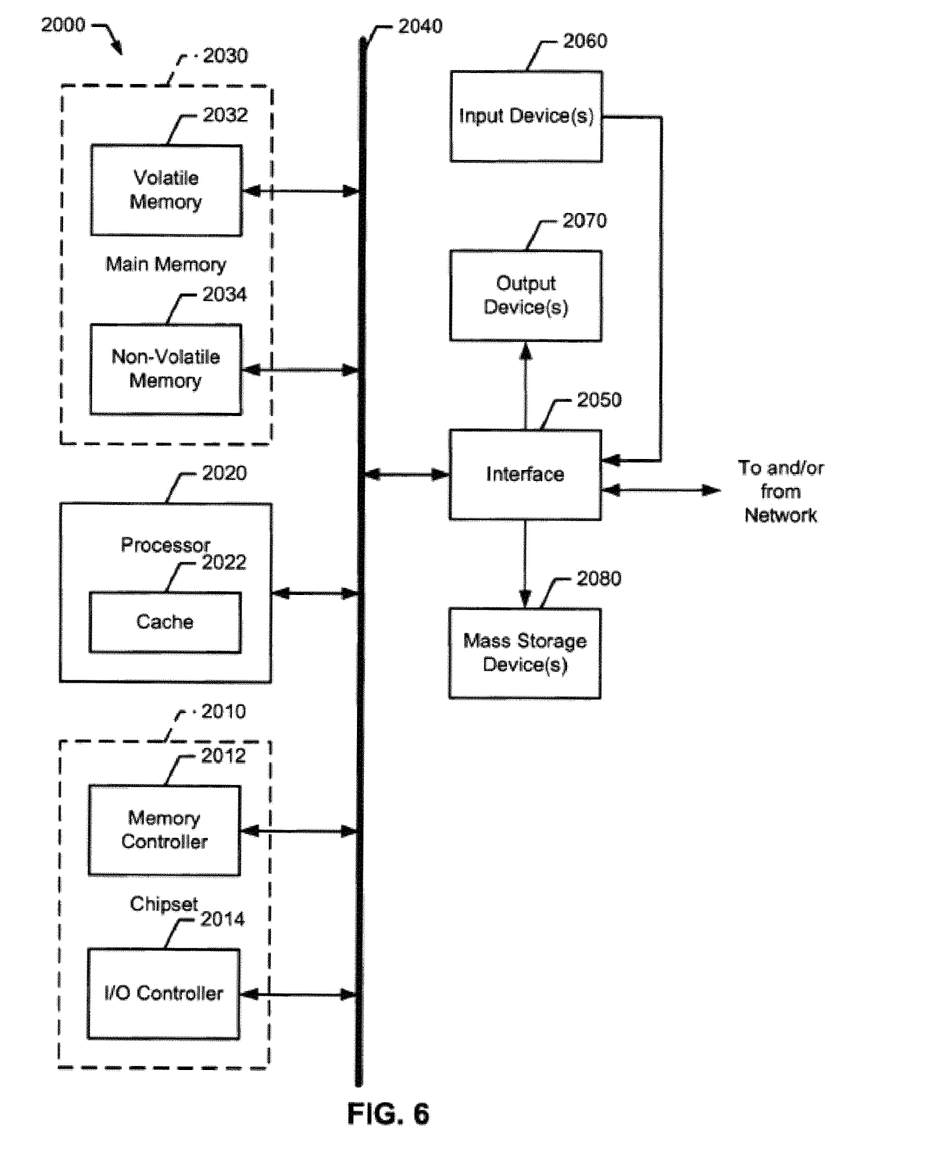
FIG. 6 is a block diagram representation of an example processor system that may be used to implement an example management server of FIG. 1.

FIG. 6 is a block diagram of an article of manufacture, including a processor system 2000, adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, a movement/gesture tracking system and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, digital versatile disks (DVD) and drives, and other tangible computer readable storage medium.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc. The communication link may also be wireless, based on standards such as Wi-Fi, WiMax, Bluetooth, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

In various embodiments, the main memory 2030 and/or the mass storage device 2080 may store therein programming instructions implementing an embodiment of the earlier described components and logics to practice the process illustrated in FIGS. 4 and 5 above, including screen capture engine 221, virtual screen engine 222, management protocol engine 223, input processing engine 224 and/or input injection engine 225. The various components described earlier, including screen capture engine 221, virtual screen engine 222, management protocol engine 223, input processing engine 224 and/or input injection engine 225, may communicate with each other through the bus 2040, and the management protocol engine 223 may transmit the user interface display to the management station 130 over the network via the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method, comprising:
    establishing, by a management server, a communication session with a management station in accordance with a management protocol to manage a managed device;
    capturing, by the management server, a user interface display of the managed device;
    modifying, by the management server, the user interface display by adding to the user interface display additional user interface elements corresponding to additional functions directed towards management of the managed device and by adding to the user interface display an auxiliary user interface display containing the additional user interface elements;
    transmitting, by the management server, the modified user interface display to the management station;
    receiving, by the management server, user interface input;
    determining, by the management server, whether the user interface input is directed towards the additional user interface elements contained in the auxiliary user interface display or original elements of the captured user interface display; and
    processing, by the management server, the received user interface input based on a result of the determining.

2. The method of claim 1, further comprising:
    transmitting, by the management server, the modified user interface display to the management station in accordance with the management protocol to enable the management station to use the additional functions without modifying the management station.

3. The method of claim 1, wherein processing the user interface input based on a result of the determining further comprises:
    evoking one or more of the additional functions, in response to determining that the user interface input is directed towards the additional user interface elements.

4. The method of claim 1, wherein processing the user interface input based on a result of the determining further comprises:
    forwarding the user interface input to the managed device, in response to determining that the user interface input is directed towards the original elements of the captured user interface display.

5. The method of claim 1, further comprising modifying by the management server, the user interface display by at least one of:
- adding additional user interface elements to the user interface display,
- replacing the user interface display with a display containing additional user interface elements, and
- adding to the user interface display a layer of the additional user interface elements on top of the user interface display.

6. The method of claim 1, wherein the additional functions are evokable even in an event where the managed device is unresponsive due to performance degradation or one or more failure conditions.

7. The method of claim 1, wherein the additional functions include:
- a function to power the managed device on or off; or
- a function to retrieve an event log from the managed device.

8. An apparatus, comprising:
- a screen capture engine to capture a user interface display of a managed device;
- a virtual screen engine coupled with the screen capture engine, the virtual screen engine to modify the user interface display by adding to the user interface display additional user interface elements corresponding to additional functions directed towards management of the managed device and by adding to the user interface display an auxiliary user interface display containing the additional user interface elements;
- a management protocol engine coupled with the virtual screen engine, the management protocol engine to establish a management session with a management station in accordance with a management protocol to manage the managed device, and further to transmit the modified user interface display to the management station; and
- an input processing engine, coupled with the management protocol engine to: receive user interface input, determine whether the user interface input is directed towards the additional user interface elements contained in the auxiliary user interface display or original elements of the captured user interface display, and process the received user interface input based on a result of the determination.

9. The apparatus of claim 8, wherein the management protocol engine is further to transmit the modified user interface display to the management station in accordance with the management protocol to enable the management station to use the additional functions without needing to modify the management station.

10. The apparatus of claim 8, wherein
to process the received user interface input based on a result of the determination, the input processing engine is further to evoke the additional functions in response to determination that the user interface input is directed towards the additional user interface elements.

11. The apparatus of claim 8, wherein to process the received user interface input based on a result of the determination, the
- input processing engine is further to forward the user interface input to the managed device, in response to determination that the user interface input is directed towards the original elements of the captured user interface display.

12. The apparatus of claim 8, wherein the virtual screen engine is further to modify the user interface display by at least one of:
- adding additional user interface elements to the user interface display,
- replacing the user interface display with a display containing additional user interface elements, and
- adding to the user interface display a layer of the additional user interface elements on top of the user interface display.

13. The apparatus of claim 8, wherein the additional functions are evokable even in an event where the managed device is unresponsive due to performance degradation or one or more failure conditions.

14. The apparatus of claim 8, wherein the additional functions include:
- a function to power the managed device on or off; or
- a function to retrieve an event log from the managed device.

15. An article of manufacture, comprising:
- a non-transitory computer readable storage medium; and
- a plurality of programming instructions stored on the storage medium, the plurality of programming instructions to cause a management server, in response to execution of the plurality of programming instructions by one or more processors of the management server, to:
  - establish a management session with a management station in accordance with a management protocol to manage a managed device;
  - capture a user interface display of the managed device;
  - modify the user interface display by adding to the user interface display additional user interface elements corresponding to additional functions directed towards management of the managed device and by adding to the user interface display an auxiliary user interface display containing the additional user interface elements;
  - transmit the modified user interface display to the management station;
  - receive user interface input;
  - determine whether the user interface input is directed towards the additional user interface elements contained in the auxiliary user interface display or original elements of the captured user interface display; and
  - process the received user interface input based on a result of the determination.

16. The article of manufacture in claim 15, wherein the plurality of programming instructions, in response to execution of the plurality of instructions by the one or more processors of the management server, further cause the management server to:
- transmit the modified user interface display to the management station in accordance with the management protocol to enable the management station to use the additional functions without needing to modify the management station, so long as the management station is compatible with the management protocol.

17. The article of manufacture in claim 15, wherein to process further includes:
- invocation of the additional functions in response to determination that the user interface input is directed towards the additional user interface elements.

18. The article of manufacture in claim 15, wherein to process further includes:

forwarding the user interface inputs to the managed device, in response to determination that the user interface input is directed towards the original elements of the captured user interface display.

19. The article of manufacture in claim 15, wherein the plurality of programming instructions, in response to execution of the plurality of instructions by the one or more processors of the management server, further cause the management server to:
modify the user interface display by at least one of:
adding additional user interface elements to the user interface display,
replacing the user interface display with a display containing additional user interface elements, and
adding to the user interface display a layer of the additional user interface elements on top of the user interface display.

20. The article of manufacture in claim 15, wherein the additional functions are evokable by the one or more processors even in an event that the managed device is unresponsive due to performance degradation or one or more failure conditions.

* * * * *